Oct. 13, 1931.  H. BARTENBACH  1,826,716
GAS TIGHT PLUGGING OF CABLES AND THE LIKE
Filed March 11, 1929
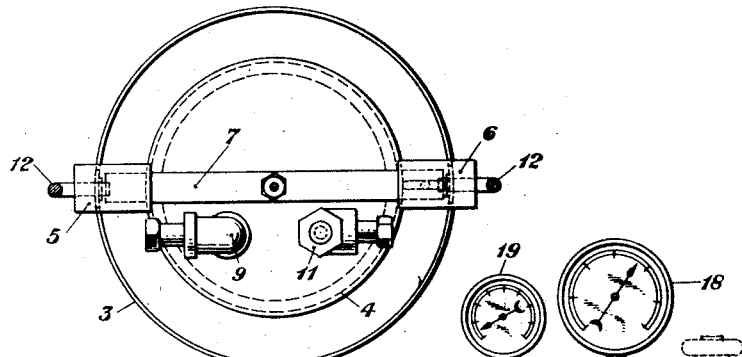
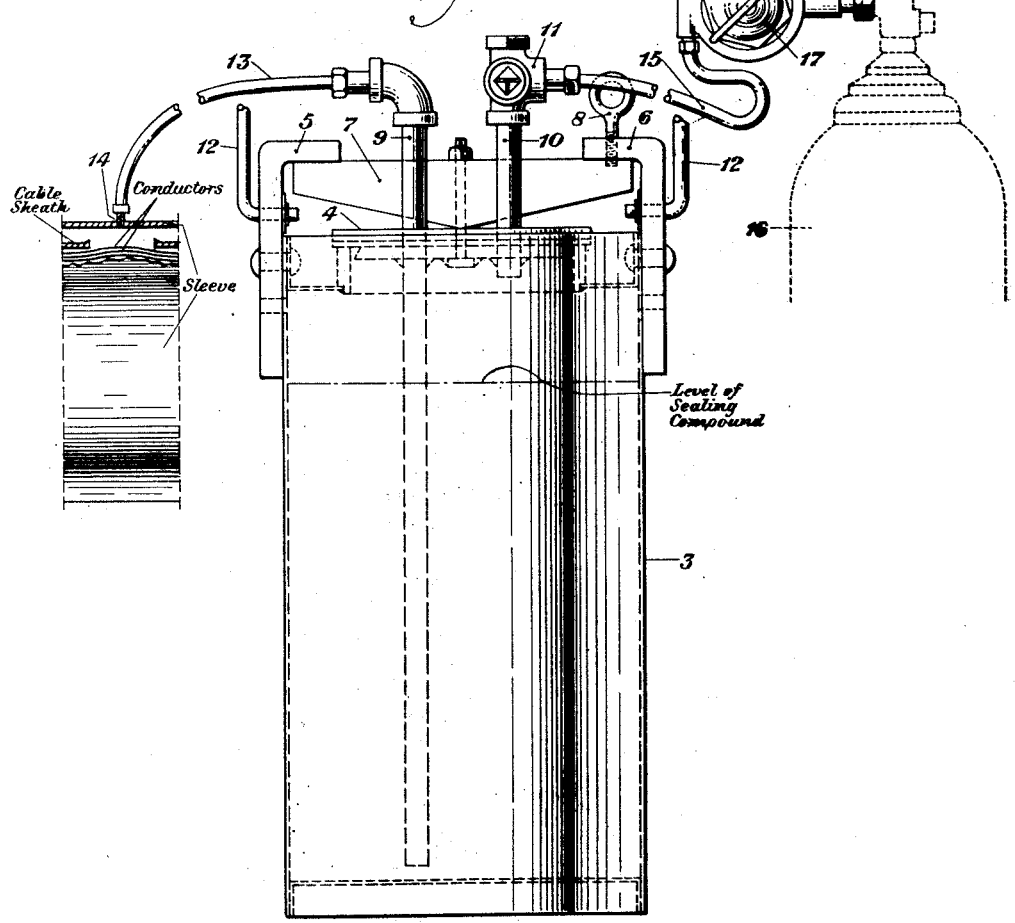
INVENTOR
H. Bartenbach
BY
ATTORNEY Patented Oct. 13, 1931

1,826,716

UNITED STATES PATENT OFFICE

HERMAN BARTENBACH, OF PITTSBURGH, PENNSYLVANIA, ASSIGNOR TO AMERICAN TELEPHONE AND TELEGRAPH COMPANY, A CORPORATION OF NEW YORK

GAS-TIGHT PLUGGING OF CABLES AND THE LIKE

Application filed March 11, 1929. Serial No. 346,026.

This invention relates to gas pressure testing of cables and the like, and more particularly to methods of and means for introducing a molten sealing compound into a cable to form a gas-tight plug.

In certain cases it is advisable that gas pressure be continuously maintained in a cable. This gas pressure serves to facilitate the detection of mechanical defects, such as holes, which occur from time to time in the cable sheath, and to prevent the entrance of water into the cable, which, but for the pressure, might take place before the defects could be located and repaired. If gas pressure is introduced into and maintained in a cable for the testing of a section of the cable, it is, of course, necessary that the section under test be isolated by some form of gas-tight plug. The plugging methods which in many respects appear to be the most satisfactory are based on the idea of wiping a sleeve over a broken section of the cable sheath and filling the sleeve with a molten sealing compound, such as wax. Certain difficulties, however, have been encountered in the application of these plugging methods, due to the fact that the sealing compound does not entirely fill the voids between the cable conductors and the insulating paper, and that the sealing compound, on cooling, shrinks away from the inner surface of the sleeve, thus providing leakage paths by which the gas escapes from the supposedly isolated section of the cable.

The principal object of the applicant's invention is the provision of a method of and suitable apparatus for plugging a cable with a sealing compound without the disadvantages indicated above.

A further object of the invention is the gas-tight plugging of a cable in a manner which involves a relatively low cost and the minimum of difficulty in forming the plugs.

In general, the applicant attains the above-stated objects by employing a gas-tight container partly filled with molten wax, or other suitable sealing compound, and forcing the compound into the cable sleeve under gas pressure to fill and plug adequately a section of the cable extending two or three feet in either direction beyond the sleeve, as will be more fully disclosed hereinafter.

The methods and the apparatus of the invention will be clearly understood when the following detailed description is read with reference to the accompanying drawings.

Figure 1 of the drawings shows a side view, partly in section, of the container and the connections therefrom to a gas tank and to a cable section, and Fig. 2 shows a partial top view of the container.

Like numerals of reference in the two figures of the drawings designate corresponding parts.

With reference to the details of the drawings, the container 3, which may have a capacity of 10 quarts, for example, is equipped with a removable cover 4. This cover 4 can be clamped in place to render the container 3 gas-tight by means of the lugs 5 and 6 and the cross bar 7, which is held in association with the cover 4 by a suitable bolt, as indicated in Fig. 1. When it is desired to lock the cover 4 in place, the bar 7 is swung under the lugs 5 and 6 and the screw member 8 is tightened.

A pipe 9, which has a diameter of ¼ inch, for example, extends through the cover 4 to a point near the bottom of the container 3. At the top of the pipe 9 a suitable fitting provides for attachment to a flexible hose 13. A short pipe 10 is also provided, passing through the cover 4. This pipe 10 is connected through a three-way cock 11, for example, and a flexible hose 15 to a gas tank 16. A reducing valve 17, a high pressure gauge 18 and a low pressure gauge 19 are associated with the tank 16 and the hose 15 as shown.

A handle 12 is secured to the container through holes in the lugs 5 and 6, as indicated. This handle may be used to hang the container on a strand, for instance.

When a cable is to be plugged, the cable sheath may be cut away over a short section, the conductors separated, and a sleeve wiped over the perforated section of the cable. The wax or other suitable sealing compound is heated to the temperature necessary to render it fluid in the container 3—by means of a splicer's furnace, for example,—and the cover 4 is clamped securely in place. The level of the molten sealing compound should be approximately at the line shown in Fig. 1. The container 3 is raised to the strand or lowered into the manhole, as the particular case may require, and the hose 13 is then connected to the sleeve, in which a hole 14 has been drilled, by any suitable means.

The gas from tank 16 is now admitted to the container 3 through pipe 10 at a pressure of approximately 30 pounds per square inch, as indicated on the gauge 19, for a period of two or three seconds, and the compound is forced up through pipe 9 and to the cable. At the end of the period of two or three seconds, the reducing valve 17 is closed to shut off the gas at the tank, and the back pressure is indicated at the gauge 19 on the low pressure side of the reducing valve. If a back pressure of 30 pounds is indicated and this pressure remains constant for several minutes, it may be assumed that the cable has been effectively plugged. If, however, the back pressure falls off, the gas is again admitted to the container for a period of two or three seconds, and the back pressure is again observed. The operation of admitting the gas to the container 3 for a period of two or three seconds, closing the reducing valve 17 and then observing for several minutes the back pressure indicated on gauge 19, is repeated until the pressure so indicated remains constant for the period of several minutes.

While the apparatus of the invention has been specifically disclosed, for the purpose of illustration, it will be understood that the invention is capable of embodiment in other and different forms within its true scope as determined by the appended claims.

In applicant's copending application, Serial No. 455,443, filed May 24, 1930, which is a division of this application, there is disclosed and claimed the apparatus herein described.

What is claimed is:

1. The method of plugging cables and the like against the flow of gas therethrough, which consists in forcing a molten sealing compound into the cable or other structure to be plugged by the application of a gas pressure, terminating the application of said gas pressure, and determining the back gas pressure.

2. The method of plugging cables and the like against the flow of gas therethrough, which consists in forcing a molten sealing compound into the cable or other structure to be plugged by the application of a gas pressure, interrupting the application of the gas pressure, determining the back gas pressure, and repeating the steps of applying the gas pressure and determining the back pressure until said back pressure is found to remain practically constant.

3. The method of plugging cables and the like against the flow of gas therethrough, which consists in partly filling a container with a sealing compound, heating the compound sufficiently to render it fluid, rendering the container gas-tight, providing for the egress of the compound from the lower portion of the container toward the cable or other structure to be plugged, introducing gas into the upper portion of the container at a known pressure, terminating the introduction of the gas, and determining the back gas pressure in the container.

4. The method of plugging cables and the like against the flow of gas therethrough, which consists in partly filling a container with a sealing compound, heating the compound sufficiently to render it fluid, rendering the container gas-tight, providing for the egress of the compound from the lower portion of the container toward the cable or other structure to be plugged, introducing gas into the upper portion of the container at a known pressure, interrupting the introduction of the gas, determining the back gas pressure in the container, and repeating the steps of introducing the gas and determining the back gas pressure until said back pressure is found to remain practically constant.

In testimony whereof, I have signed my name to this specification this 7th day of March, 1929.

HERMAN BARTENBACH.